Nov. 30, 1937. E. A. GRANGE ET AL 2,100,542
WHEEL WITH RUBBER LIKE TREAD
Filed Nov. 15, 1935 2 Sheets-Sheet 1

Inventors
Edward A. Grange
and
Erwin J. Schmidt
By Fricke & DeBuck
Attorneys

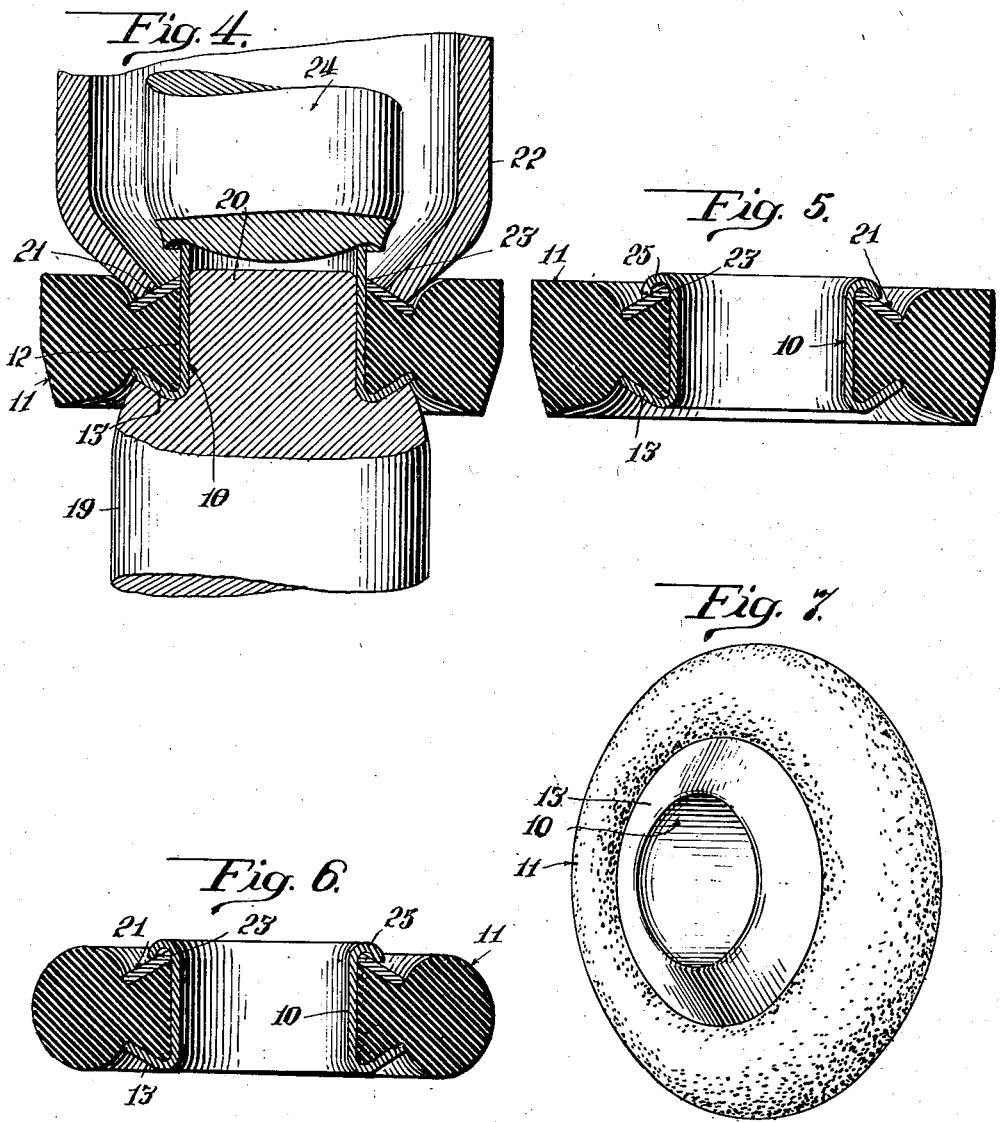

Patented Nov. 30, 1937

2,100,542

UNITED STATES PATENT OFFICE 2,100,542

WHEEL WITH RUBBER-LIKE TREAD

Edward A. Grange and Erwin J. Schmidt, Chicago, Ill., assignors to Allied Engineering Company, Chicago, Ill., a corporation of Illinois Application November 15, 1935, Serial No. 49,880

8 Claims. (Cl. 301—5.3)

Our invention relates to the type of wheel illustrated and claimed in the application of Erwin J. Schmidt, one of the present applicants, filed December 4, 1933, Serial No. 700,869; and it has for its object the provision of a new and improved form and arrangement of parts in a wheel of this type, by which improved results may be attained.

We have found in connection with the wheel of said prior application that the circumferential expansion and stretching of the outer portion of the rubber-like tread member resulting from axial compression of said member is of great importance in the matter of maintaining the tread member in operative position in use. It is one of the objects of our present invention to provide an improved arrangement of parts whereby the frame parts of the wheel shall have an improved gripping effect on the tread member for holding it in the desired operative position, without however interfering with the effectiveness of the arrangement both with respect to the capability of the wheel to yield under radial pressure thereon and with respect to the tendency of the rubber or other yieldable material of the tread member continuously in successive instances to flow under radial pressure thereon and to return to its normal position and normal condition upon removal of radial pressure therefrom.

It is another object of our invention to improve devices of this type in sundry details hereinafter pointed out. The preferred means by which we have accomplished our several objects are illustrated in the drawings and are hereinafter specifically described. That which we believe to be new and desire to cover by Letters Patent is set forth in the claims.

In the drawings—

Fig. 4 is a view similar to Fig. 3 but showing the tread member compressed axially and expanded further diametrically on its supporting sleeve with the separate flange in pressure applying position on the sleeve against the tread;

Fig. 5 is a longitudinal sectional view of the wheel showing the end of the sleeve adjacent the separate flange rolled over against the outer face of the flange to hold it in pressure applying position;

Fig. 6 is a longitudinal sectional view of the completed wheel, the outer portion of the tread member having been shaped in a lathe; and Fig. 7 is a perspective view of the completed wheel.

Figure 1:
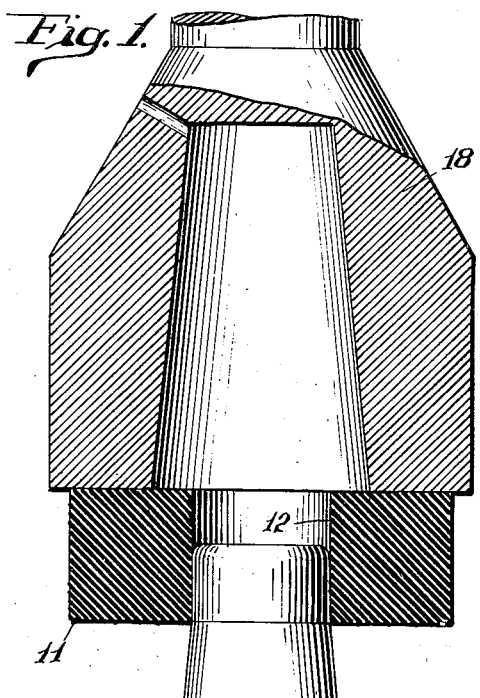
Fig. 1 is a longitudinal sectional view of devices constituting an arrangement suitable for assembling the parts of our novel wheel according to one method, the tread member being shown in section on an expanding element before either being compressed axially or expanded diametrically.

Referring now to the several figures of the drawings, in which corresponding parts are indicated by the same reference characters, 10 indicates a metallic sleeve adapted to serve as the rim, or perhaps when the wheel is of small diameter better called the hub, of a wheel for supporting an uninterrupted annular tread member 11 of soft rubber or other similar functioning material forming what may be called the body of the wheel. The tread member 11 is provided with a central opening 12 therethrough of substantially smaller size diametrically than the size of the sleeve 10, when said member and sleeve are dissociated, whereby it is necessary that the tread member be stretched and expanded to a substantial extent in placing the tread member in position upon such over-sized sleeve. In the arrangement shown, the sleeve 10 is provided at one end with a flange 13 formed integrally therewith.

For placing the tread member 11 in position upon the sleeve 10, we have provided a support 14 having a lug 15 rising therefrom of a size to have a snug working fit in the lower end of the sleeve 10. In the upper end of the sleeve 10 as shown in Fig. 1, we have mounted a tapered pin 16 having a lug 17 on its lower end adapted to have a snug working fit in the upper end of the sleeve 10, the upper end portion of the pin 16 being straight and of such size as to have an easy working fit in the opening 12 of the tread member 11 as shown in Fig. 1 when said tread member is in its normal unrestrained condition. For pressing the tread member 11 downwardly along the tapered portion of the pin 16 for stretching and expanding the member for enabling it to pass into position upon the sleeve 10, we have provided a reciprocating member 18 which is movable downwardly under pressure for carrying the tread member down along the pin and into position on the sleeve as is shown in Fig. 2.

Figure 3:
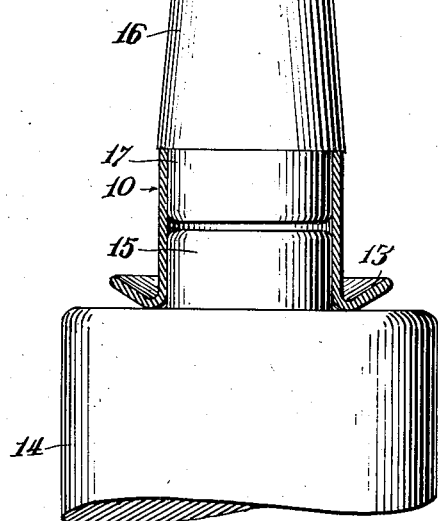
Fig. 3 is a longitudinal sectional view of the tread member in stretched and expanded condition on its supporting sleeve showing the separate flange member in position on the tread member before the application of pressure thereto.
Figure 3:
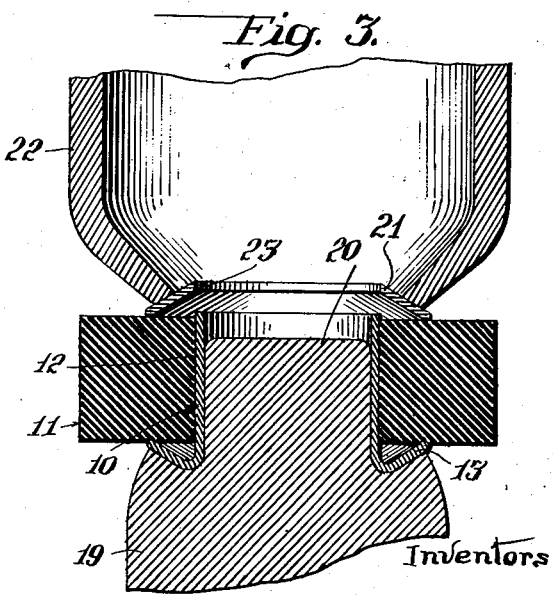

With the tread member 11 in position thereon, the sleeve 10 is placed upon a support 19 provided with a lug portion 20 fitting into the sleeve 10 for holding the sleeve in position and supporting it internally during the operations now to be described. A flange member 21 is then placed in position above the sleeve 10 and tread member 11 and between the tread member and a reciprocating pressure applying sleeve 22 by which the flange 21 is capable of being forced downwardly from the position shown in Fig. 3 into the position shown in Fig. 4. The flange 21 is provided with an opening 23 therethrough of a size to have a sliding fit upon the sleeve 10 and arranged so that when the flange is in position upon the sleeve, as shown in Fig. 4, that flange in combination with the flange 13 provide an outwardly open channel extending circumferentially about the sleeve. The flanges have their inner faces undercut or so arranged that their inner faces are convergently disposed outwardly with respect to each other thereby providing the channel with a restricted mouth at its open side. With the flange 21 moved downwardly into the position shown in Fig. 4, a suitable rotary spinning tool 24 is brought into heavy pressure engagement with the upper end of the sleeve 10 for rolling over the end of the sleeve as shown at 25 in Fig. 5, thereby holding the flange 21 in operative position.

Figure 2:
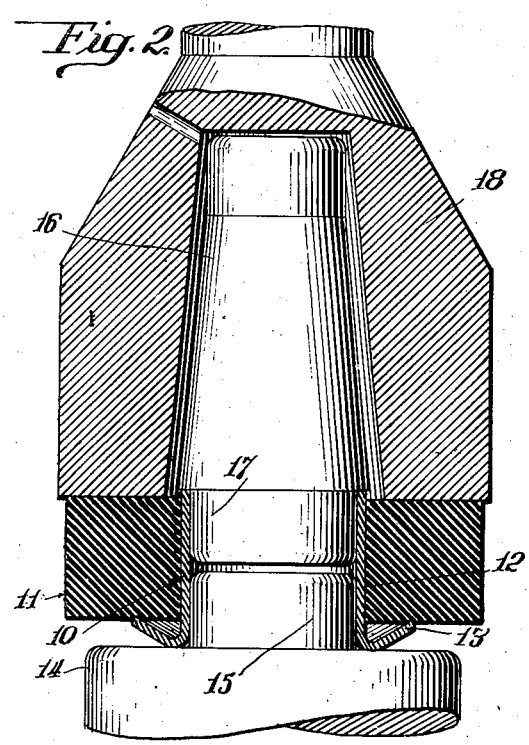
Fig. 2 is a view similar to Fig. 1 but showing the tread member stretched and expanded diametrically over its supporting sleeve.

As will be readily understood, when the tread member 11 is stretched and expanded in its movement into position upon the sleeve 10, both the thickness (radially) and the width (axially) of the member are reduced, as is seen by a comparison of Figs. 1 and 2 of the drawings. When thereafter pressure is applied upon the flange 21 for forcing it toward the flange 13 so as to apply pressure upon the side faces of the tread member 11, the tread member is substantially compressed axially of the sleeve 10, such compression being substantial closely adjacent to the face of the sleeve or the bottom of the aforesaid channel and being even greater at the circumference corresponding to the outer edge portions of the flanges 13 and 21 or at the restricted mouth of said channel. By reason of the substantial axial compression of the tread member as above described, by which the width of the inner or mounting portion of the tread member is substantially reduced, the tread member is additionally expanded and stretched, and particularly so at its outer portion, the outside diameter of the tread member in its final form, as shown in Figs. 4 and 5, being substantially greater than when in its initial form, Fig. 1, or its intermediate form, Figs. 2 and 3.

After the tread member has been secured in expanded and compressed condition on the supporting sleeve as described, the wheel may be placed in a lathe and the outer portion of the tread may be trimmed to the shape shown in Fig. 6, or any other desired shape, by means of a suitable tool.

With the sleeve 10 and the flanges 13 and 21 in the position shown in Fig. 5, it will be appreciated that the sleeve and the flanges together form an outwardly open continuous, circumferential channel which is of uniform size and shape and unobstructed throughout excepting its restricted mouth at its open side. As a result of the use of this arrangement, the outer portion at least of the tread member 11 is capable of flowing freely circumferentially and/or laterally of the wheel to the desired extent with respect to the outside faces of the inner or mounting portion of said tread member whenever radial pressure is applied to the tread member, as when in service the wheel under a load passes over a small ridge or hump in a pavement or sidewalk, and the tread member is capable of returning freely to normal condition when such radial pressure is removed; and the capacity for such flowing and return movements of the rubber-like material is the same at all points about the periphery of the wheel. By this arrangement also, the tread material is prevented from unduly stretching at any point, and the material is enabled to react freely to the countless repetitions of changes in pressure conditions occurring when the wheel is in service without any appreciable deterioration of any portion of the material by reason of the innumerable applications of pressure thereto.

With the tread member as a whole initially expanded diametrically in its application to the sleeve 10, and with the outer portion at least of the tread member expanded and stretched additionally by reason of the axial compression of the tread member, the tread member is held strongly in position upon the sleeve, the flanges 13 and 21 having a strong, lasting grip upon the mounting portion of the tread member for assisting in holding the member in position against any creepage circumferentially of the member relative to the sleeve.

Any suitable soft rubber-like material may be employed for the tread of our improved wheel. A composition material of soft rubber and fabric may be employed in some cases if desired. For wheels intended for use on such articles as roller skates, we prefer to employ a good grade of commercial soft rubber such, for example, as that used in the better grade of rubber heels for shoes. We have used the term "soft rubber-like material" in the appended claims to apply to a material of the nature above described and to distinguish the material of our tread member from a material of a hard, non-resilient or non-yielding nature.

Our improved wheels are well suited for many different kinds of service. They are particularly well adapted for use on roller skates. The treads on the wheels yield, under the weight of the person on the skate equipped with them, sufficiently to provide an effective cushion against the numerous shocks or jolts to which such wheels are subjected when skating over uneven surfaces. Wheels having treads as we have described greatly minimize slippage even when passing over smooth surfaces as when turning a sharp corner on a skating rink. The wheels take a secure grip on the skating surface and there is practically no lost motion by slippage of the wheels on said surface when skating over it. The wheels roll silently, and they have been found to stand up under severe service for a much greater period of time than the ordinary type of steel skate wheel.

While we prefer to employ the form and arrangement of parts as shown in our drawings and as above described, it is to be understood that our invention is not to be limited specifically thereto, it being evident that changes might be made in the form and arrangement of the parts without departing from the spirit of our invention.

We claim:—

1. In a wheel of the type described for roller skates and the like; the combination of an uninterrupted tread member of soft rubber-like material having a centrally located opening therethrough; a supporting member of substantially greater external size than the size of said opening, when said members are dissociated, positioned in said opening and serving to hold the tread member in stretched and expanded condition; and means comprising holding elements at the opposite ends of said supporting member adapted by engagement with side face portions of the stretched and expanded tread member to maintain it permanently in substantially compressed condition axially and in operative position on the supporting member.

2. In a wheel of the type described for roller skates and the like; the combination of an uninterrupted tread member of good grade commercial soft rubber, comparable in quality and hardness to the better rubber heels, having a centrally located opening therethrough; a supporting member of substantially greater external size than the size of said opening, when said members are dissociated, positioned in said opening and serving to hold the tread member in stretched and expanded condition; and means comprising holding elements at the opposite ends of said supporting member adapted by engagement with side face portions of the stretched and expanded tread member to maintain it permanently in substantially compressed condition axially and in operative position on the supporting member, the major portion of the tread member being unconfined.

3. In a wheel of the type described for roller skates and the like; the combination of an uninterrupted tread member of soft rubber-like material having a centrally located opening therethrough; a sleeve of substantially greater external size than the size of said opening, when said member and sleeve are dissociated, positioned in said opening and serving to hold the tread member in stretched and expanded condition; and flanges, having their inner faces convergently disposed outwardly with respect to each other, at opposite sides of said tread member, held in position by the sleeve and adapted by engagement with side face portions of the stretched and expanded tread member to hold it permanently in substantially compressed condition axially and in operative position on the sleeve.

4. In a wheel of the type described for roller skates and the like; the combination of an uninterrupted tread member of good grade commercial soft rubber, comparable in quality and hardness to the better rubber heels, having a centrally located opening therethrough; a sleeve of substantially greater external size than the size of said opening, when said member and sleeve are dissociated, positioned in said opening and serving to hold the tread member in stretched and expanded condition; and flanges, having their inner faces convergently disposed outwardly with respect to each other, at opposite sides of said tread member, held in position by the sleeve and adapted by engagement with side face portions of the stretched and expanded tread member to hold it in substantially compressed condition axially and in operative position on the sleeve, the major portion of the tread member being unconfined.

5. In a wheel of the type described for roller skates and the like; the combination of an uninterrupted tread member of soft rubber-like material having a centrally located opening therethrough; a sleeve of substantially greater external size than the size of said opening, when said member and sleeve are dissociated, positioned in said opening and serving to hold the tread member in stretched and expanded condition; a flange rigidly connected with said sleeve at one end thereof in engagement with a portion of one side of said tread member; and a second flange slidably positioned over the sleeve at its opposite end in engagement with a portion of the other side of said tread member, the end of the sleeve adjacent the second flange being turned over against the outer face of that flange to hold it in position, the arrangement being such that the stretched and expanded tread member is substantially compressed axially on the sleeve between the flanges and is held from movement circumferentially about the sleeve.

6. In a wheel of the type described for roller skates and the like; the combination of an uninterrupted tread member of good grade commercial soft rubber, comparable in quality and hardness to the better rubber heels, having a centrally located opening therethrough, a sleeve of substantially greater external size than the size of said opening, when said member and sleeve are dissociated, positioned in said opening and serving to hold the tread member in stretched and expanded condition; a flange rigidly connected with said sleeve at one end thereof in engagement with a portion of one side of said tread member; and a second flange slidably positioned over the sleeve at its opposite end in engagement with a portion of the other side of said tread member, the end of the sleeve adjacent the second flange being turned over against the outer face of that flange to hold it in position, the inner faces of said flanges being convergently disposed outwardly with respect to each other, the arrangement being such that the stretched and expanded tread member is substantially compressed axially on the sleeve between the flanges and is held from movement circumferentially about the sleeve.

7. In a wheel of the type described for roller skates and the like; the combination of an uninterrupted tread member of soft rubber-like material having a centrally located opening therethrough; a supporting structure of substantially greater external size than the size of said opening, when said member and structure are dissociated, positioned in said opening and serving to hold the tread member in stretched and expanded condition; and means carried by said structure at its opposite ends for applying pressure on the side faces of the inner portion of said tread member for compressing the stretched and expanded tread member axially and producing therein greater axial compression at a circumference spaced outwardly a distance from the supporting structure than is done directly at the supporting structure and serving to maintain in the outer portion at least of the tread member stresses substantially uniform circumferentially thereof, the outer portion of the tread member constituting the major part thereof and being unconfined, said tread member when free of the supporting structure being of substantially greater axial length than when compressed on said supporting structure.

8. In a wheel of the type described for roller skates and the like; the combination of an uninterrupted tread member of good grade commercial soft rubber, comparable in quality and hardness to the better rubber heels, having a centrally located opening therethrough; a supporting sleeve of substantially greater external size than the size of said opening, when said member and sleeve are dissociated, positioned in said opening and serving to hold the tread member in stretched and expanded condition; and flanges carried by said sleeve at its opposite ends for applying pressure on the side faces of the inner portion of said tread member for compressing the stretched and expanded tread member axially and so arranged that they produce therein greater axial compression at a circumference spaced outwardly a distance from the sleeve than is done directly at the sleeve and serving to maintain in the outer portion at least of the tread member stresses substantially uniform circumferentially thereof, the outer portion of the tread member constituting the major part thereof and being unconfined, said tread member when free of the sleeve being of substantially greater axial length than when compressed on said sleeve.

EDWARD A. GRANGE.
ERWIN J. SCHMIDT.